United States Patent [19]

Kobayashi et al.

[11] Patent Number: 4,833,467

[45] Date of Patent: May 23, 1989

[54] DATA TRANSMISSION SYSTEM

[75] Inventors: Hiroshi Kobayashi; Shinji Suda; Katsunobu Hongo, all of Itami, Japan

[73] Assignee: Mitsubishi Denki Kabushiki Kaisha, Tokyo, Japan

[21] Appl. No.: 19,178

[22] Filed: Feb. 26, 1987

[30] Foreign Application Priority Data

Feb. 28, 1986 [JP] Japan ................................ 61-44637

[51] Int. Cl.[4] ................................................ H04Q 7/00

[52] U.S. Cl. ...................... 340/825.640; 340/825.720; 455/603

[58] Field of Search ...................... 340/825.63, 825.64, 340/825.57, 825.72; 367/197; 455/603

[56] References Cited

U.S. PATENT DOCUMENTS 3,753,221 8/1973 Stevens .............................. 367/197
4,232,297 11/1980 Gerlach et al. ............... 340/825.65
4,412,218 10/1983 Nitsu ............................. 340/825.56
4,482,947 11/1984 Zato et al. .......................... 455/603
4,514,732 4/1985 Hayes, Jr. ...................... 340/825.57
4,558,316 12/1985 Yong ............................. 340/825.63
4,703,324 10/1987 White ............................ 340/825.72

FOREIGN PATENT DOCUMENTS 30392 3/1981 Japan .
227547 11/1985 Japan .

*Primary Examiner*—Donald J. Yusko
*Attorney, Agent, or Firm*—Saidman, Sterne, Kessler & Goldstein

[57] ABSTRACT

In a digital data transmission system, a transmitting device converts the data to be transmitted into a series of bits, in the form of data pulses. Each data pulse is positioned between successive synchronous pulses having a fixed time period, and each bit is represented by the time length between a data pulse and a preceding synchronous pulse or a succeeding synchronous pulse. The transmitting device transmits the series of the data pulses and the synchronous pulses. A receiving device receives the series of the data pulses and the synchronous pulses and decodes the same to read the data.

5 Claims, 4 Drawing Sheets

DATA TRANSMISSION SYSTEM

BACKGROUND OF THE INVENTION

The present invention relates to a system of data transmission, particularly one suitable for digital remote control using infrared rays.

A remote control system such as one used in home appliances comprises, as shown in FIG. 1, a transmitter circuit 31, and a light emitting element such as a light emitting diode 33 which are provided in a remote controller and a photo detector such as a photo diode 34 and receiver circuit 32 which are provided in the main part (operative part) of the appliance such a TV set, a VTR, or an air conditioner.

The information or command inputted by mainipulation of keys, not shown, on the remote controller is coded and modulated in the transmitter circuit 31 and is converted at the light emitting element 33 into optical signals, which are propagated typically through the air. The transmitted optical signals are received by the photo detector 34 and converted into electrical signals, which are then demodulated and decoded.

The system shown in FIG. 1 is disclosed in the U.S. patent application Ser. No. 727,153 filed Apr. 25, 1984, abandoned, and assigned to the same assignee as the present application. In the system of FIG. 1, "0" and "1" are identified according to the length of the interval between successive pluses. For instance, the shorter time interval (41 in FIG. 1) between a rising edge of a first pulse and a rising edge of a succeeding pulse denotes "0" while the longer time internal (42 in FIG. 1) between the rising edges of the two successive pulses denotes "1". A certain number of bits consisting of "0"s and "1"s as denoted by different time intervals form a "word", as shown in FIG. 2. In FIG. 2, each word is formed of 6 bits. Various words are used to define instructions.

The above-described system has a drawback in that the time length required for transmitting each word is varied depending on the number of "0"s or "1"s. At the receiving end, the time length of each word is therefore unknown until the end of the transmission of each word. This makes the decoding difficult.

Moreover, the system is easily affected by noises. For instance, when a noise 61 enters during a time interval for "1" as shown in FIG. 4, this will be decoded, at the receiving end, as "00". Such a misinterpretation causes an erroneous operation, which is undesirable in a remote control system.

SUMMARY OF THE INVENTION

An object of the invention is to provide a data transmission system which has an improved immunity to noises.

According to the invention, there is provided a data transmission system comprising a transmitting device for converting the data to be transmitted into a series of bits, in the form of data pulses, each date pulse being positioned between successive synchronous pulses having a fixed time period, each bit being represented by the time length between a data pulse and a preceding synchronous pulse or a succeeding synchronous pulse, and transmitting the series of the data pulses and the synchronous pulses, and a receiving device for receiving the series of the data pulses and the synchronous pulses and decoding the same to read the data.

With the arrangement described above, the time length for each bit is fixed and the time length for each word can therefore be fixed. Decoding of data is therefore facilitated. Moreover, any noise having entered can be suppressed at the receiving end. When the data transmission system is used in a remote control system, erroneous operations can be avoided.

DETAILED DESCRIPTION OF THE PREFERRED EMBODIMENTS

Figure 1:
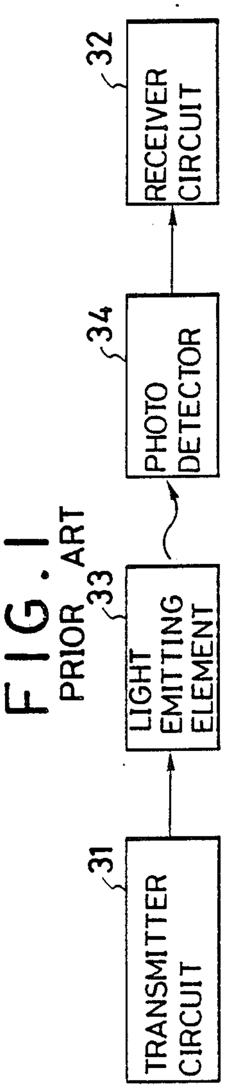
FIG. 1 PRIOR ART
FIG. 1 is a block diagram showing a prior art system for data transmission for use in remote control.
Figure 2:
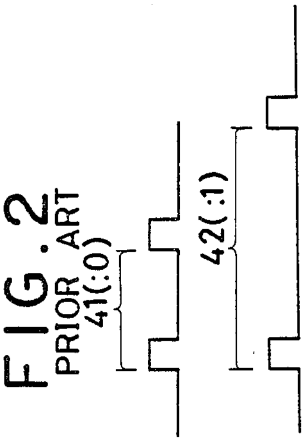
FIG. 2 PRIOR ART
FIG. 2 is a timechart showing signals for bits "0" and "1" according to the system of FIG. 1.
Figure 3:
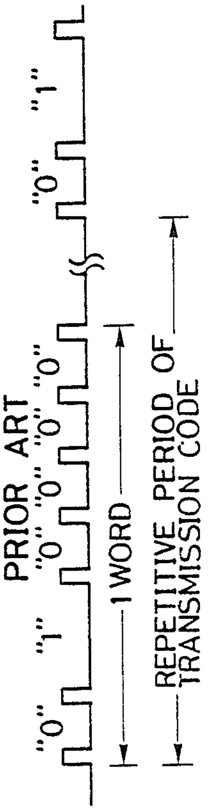
FIG. 3 PRIOR ART
FIG. 3 is a diagram showing an example of transmitted code composed of 6 bits according to the system of FIG. 1.
Figure 4:
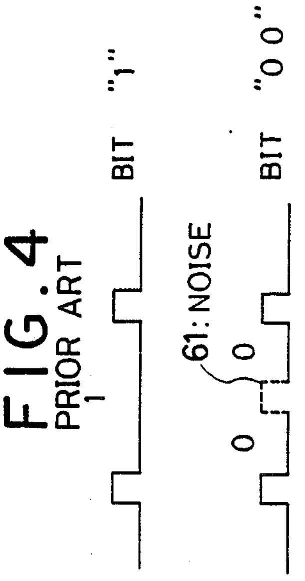
FIG. 4 PRIOR ART
FIG. 4 is a timechart showing the effect of a noise.

An embodiment of the data transmission system according to the invention will now be described with reference to FIG. 5 in which the same reference numerals as in FIG. 1 denote identical or similar components. As will be seen, the transmission system of FIG. 5 can be depicted to comprise blocks identical to the system of FIG. 1. However the function of the blocks differ.

Figure 6:
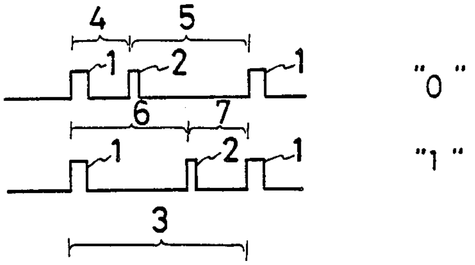
FIG. 6 is a timechart showing signals for bits "0" and "1" according to the system of FIG. 5.

As will be seen from FIG. 6, data pulses 2 are inserted between successive synchronous pulses 1 having a fixed period 3. The time intervals 4 and 6 are between the data pulses and the immediately preceding synchronous. pulses 2. The time intervals 5 and 7 are between the data pulses and the immediately succeeding data pulses 2. As an example, the period 3 of the synchronous pulses 1 is 3 ms. The time length 4 set for the bit "0" is 1 ms. The time length 6 set for the bit "1" is 2 ms. The width of the synchronous pulse 1 is 0.25 ms.

Figure 7:
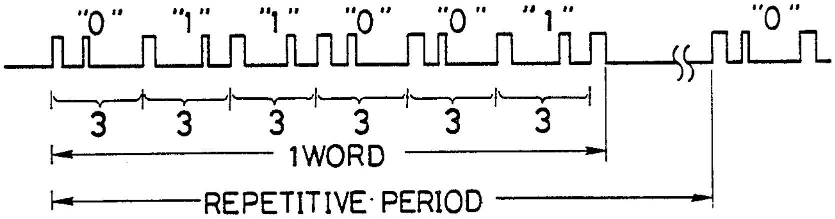
FIG. 7 is a timechart showing an example of transmitted code composed of 6 bits according to the system of FIG. 5.

For further discussion of the system of the invention, let us immagine data configuration as shown in FIG. 7. Each word has 7 synchronous pulses. Data pulses are inserted at positions corresponding to the respective bits "0" and "1". In the example of FIG. 6, the code transmitted is "011001". The time length for each word is 18.25 ms (=3 ms ×6 +0.25 ms) irrespective of the number of "0"s (or "1"s).

Figure 8:
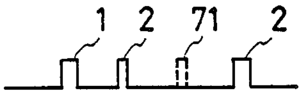
FIG. 8 is a timechart showing a noise as well as data pulses.

When a noise 71 enters as shown in FIG. 8, two pulses will be detected during a period between successive synchronous pulses. It is therefore readily detected at the receiving end that there has been a noise pulse. Misinterpretation at the receiving end can therefore be avoided.

In the embodiment described above, the period of the synchronous pulses is set at 3 ms and the time lengths for "1" and "0" are set at 2 ms and 1 ms, respectively. But these may be changed as required.

Moreover, the synchronous pulses and the data pulses may be transmitted after being modulated at a specific frequency, so that the necessary frequency band can be reduced.

Furthermore, a lead pulse having a larger pulsewidth may be placed in front of the code for the data being transmitted.

The pulsewidth of the data pulses and the pulsewidth of the synchronous pulse may be made different so that it is easier at the receiving end to identify them.

The embodiment described is for transmitting light. But the invention is also applicable in a system where electric wave is used. The invention is not limited to a wireless system but is also applicable to systems where data is transmitted through electrical conductors, or light guides.

The data transmission system of the invention, particularly the embodiment described with reference to Figs.5 through 8 is suitable for use in a remote control system for a home appliances or consumer electric devices such as TV sets, VTRs and air conditioners. In such a case, the system according to the invention is particularly advantageous in that the system can be implemented with the use of simple and less expensive elements. This is because the configuration of the signals is simple. Another ground for the advantage is that the system has a high immunity to noises, such as noises from an illuminating fluorescent light.

Figure 5:
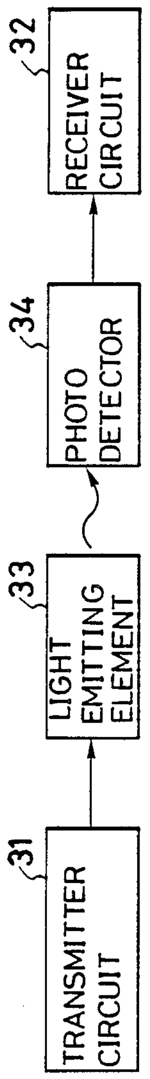
FIG. 5 is a block diagram showing a system for data transmission according to the invention.
Figure 9:
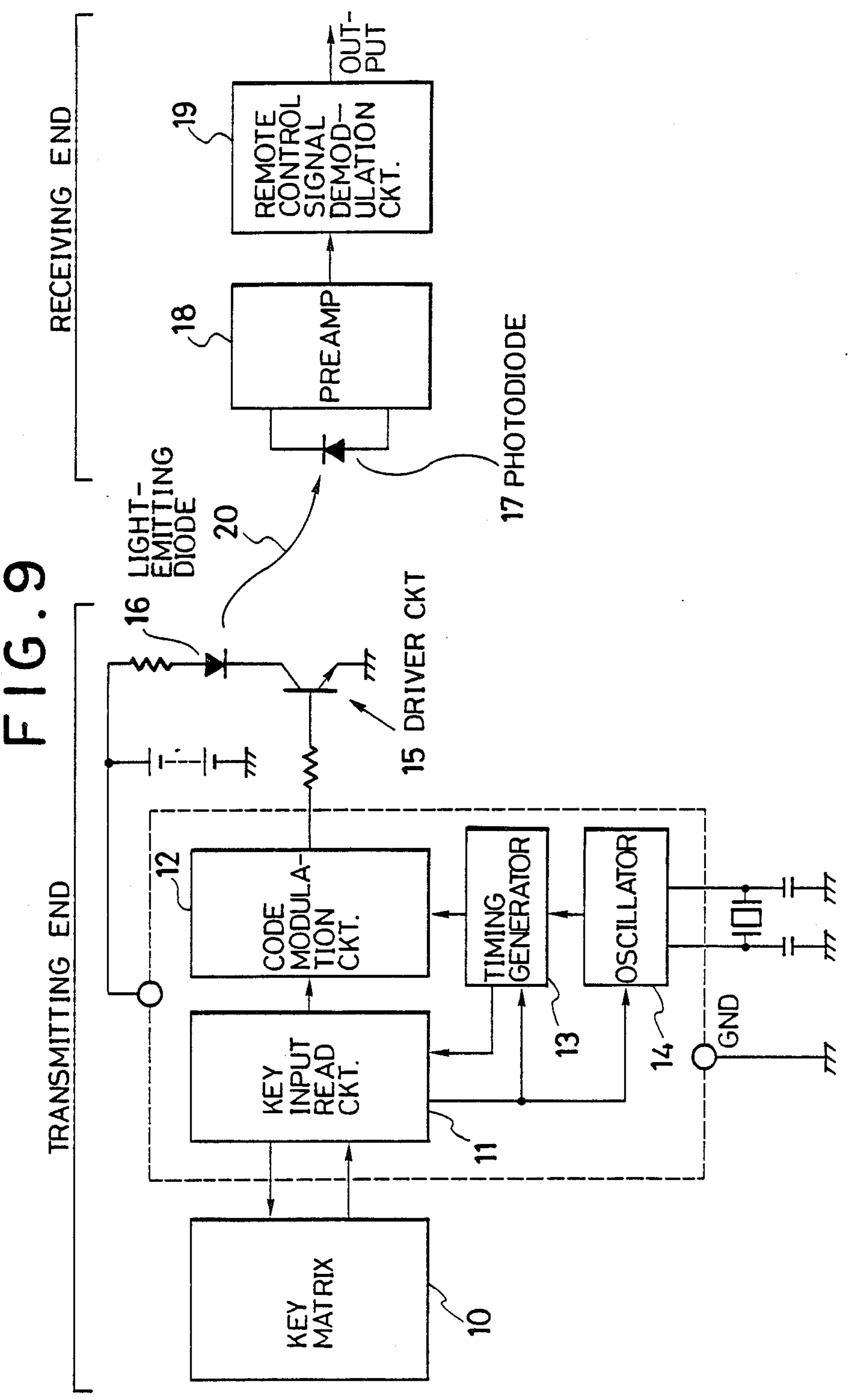
FIG. 9 is a block diagram showing an example of remote control system incorporating the data transmission system of FIG. 5.

FIG. 9 shows an example of a digital remote control system incorporating the data transmission system of FIG. 5. As illustrated, there is provided, at the transmitting end, i. e., a remote controller, a key matrix 10 for manually inputting the instructions for the electric apparatus such as a TV set, a VTR, or an air conditioner. When a key in the key-matrix 10 is depressed, a key input read circuit 11 detects the data as represented by the key thus depressed and applies the data to a code modulation circuit 12. Control signals for the code modulation circuit 12 are supplied by a timing generator 13 receiving timing pulses from a clock oscillator 14. In the code modulation circuit 12, a data code corresponding to the inputted data is produced and converted into series of data pulses each positioned between successive synchronous pulses. The position of each data pulse between the synchronous pulses, i. e., the interval between the data pulse and one (the preceding one or the succeeding one) of the synchronous pulses vary depending on whether the bit is "0" or "1".

The output of the code modulation circuit 12 is applied to a transistor of a driver circuit 15, thereby to drive a light-emitting diode 16 to cause the latter to output a modulated light signal.

At the receiving end, i. e., the operative part of the electric apparatus to be controlled by the remote controller, the transmitted light signal is received by a photodiode 17, the output of which is applied through a preamplifier to a remote control signal demodulation circuit 19. The signal thus applied is demodulated and used for the control of electric apparatus.

What is claimed is:

1. A digital data transmission system comprising a transmitting device for converting the data to be transmitted into a series of bits, each bit being in the form of a data pulse positioned between successive regularly occurring synchronous pulses, each bit being defined by a time length between a data pulse and any of a preceding synchronous pulse and a succeeding synchronous pulse, and for transmitting the series of the data pulses and the synchronous pulses, and a receiving device for receiving the series of the data pulses and the synchronous pulses and decoding the same to read the data.

2. A system according to claim 1, wherein the pulsewidth of the data pulses differs from the pulsewidth of the synchronous pulses.

3. A system according to claim 1, wherein the time length between each of the data bits and the immediately preceding synchronous pulse represents the binary "0" or "1".

4. A system according to claim 1, wherein the said time length may have either a first value or a second value to represent binary "0" or "1".

5. A digital control system having a remote controller and a controlled equipment to be controlled in accordance with a signal transmitted from the remote controller, said remote controller converting the control instruction into a series of bits, each bit being in the form of a data pulse positioned between successive regularly occurring synchronous pulses, each bit being defined by a time length between a data pulse and any of a preceding synchronous pulse and a succeeding synchronous pulse, and transmitting the series of the data pulses and the synchronous pulses, and the controlled equipment receiving the series of the data pulses and the synchronous pulses and decoding the same to read the data, and using the data for control.

* * * * *